United States Patent [19]

Takahashi

[11] Patent Number: 5,538,177
[45] Date of Patent: Jul. 23, 1996

[54] METHOD FOR WELDING METALLIC ALLOY PARTS

[76] Inventor: Susumu Takahashi, 236-50, Fujizuka, Hodogaya-ku, Yokohama, Japan

[21] Appl. No.: 364,824

[22] Filed: Dec. 27, 1994

[30] Foreign Application Priority Data

Jan. 20, 1994 [JP] Japan .................... 6-032809

[51] Int. Cl.$^6$ .................................. B23K 20/14
[52] U.S. Cl. .................. 228/196; 228/207; 228/219; 228/262.41; 228/262.6
[58] Field of Search ........................... 228/196, 207, 228/219, 223, 262.41, 262.6

[56] References Cited

U.S. PATENT DOCUMENTS

| 4,475,960 | 10/1984 | Yamawaki et al. ............ 228/207 X |
| 4,663,244 | 12/1987 | Herrnkind et al. ............ 228/262.51 |
| 4,888,067 | 12/1989 | Sato et al. .................... 228/223 |

*Primary Examiner*—Kenneth J. Ramsey
*Attorney, Agent, or Firm*—Shlesinger, Fitzsimmons, Shlesinger

[57] ABSTRACT

Metallic alloy parts which contain easily oxidizable metallic elements, are welded without solder by applying a non-deliquescent flux thereto at a negligible amount and subjecting them to a high temperature under an inert and non-explosive atmosphere.

5 Claims, 3 Drawing Sheets

METHOD FOR WELDING METALLIC ALLOY PARTS

BACKGROUND OF THE INVENTION

This invention relates to a method for welding metallic alloy parts which are difficult to braze because they contain readily oxidizable elements such as Al, Ti, Zr, and so on.

Copper-base or iron-base alloys which contain Al, Ti, Zr, and so on, are much employed today in various machinery parts. However, they are difficult to braze, as mentioned above. In brazing them a chloride flux which is deliquescent, has been used in large quantities for cleaning readily oxidizable joints of them to be brazed. Thereafter, they are brazed by a solder, and their joints are washed to remove the flux. Such washing is laborious, and waste water after washing is to be treated.

In view of the above-mentioned background, a principal object of this invention is to provide a method for welding copper-base or iron-base metallic alloy parts containg Al, Ti, Zr, and so on, in which a flux is not to be washed off after welding, and an amount of the flux can be minimized.

BRIEF SUMMARY OF THE INVENTION

In order to achieve the aforementioned object, a non-deliquescent flux which contains fluorides or fluorine compounds, is utilized in this invention. As the object of this invention is not to braze the parts by a solder, but to weld them without the employment of a solder, a copper-base or iron-base alloy parts must be brought to a high temperature as much as more than 1,100° C. Under such high temperature, when a flux which is liquidous, makes contact with a welding atmosphere which is rich in moisture or oxygen, the flux is largely consumed. This means that the flux is required in large quantities, and its residues remain at joints also in large quantities. Although residues of a non-deliquescent flux are not corrosive, and accordingly they are not to be washed off, they are preferably to be as small as possible.

In this view, in order to minimize the consumption of flux and also to prevent the parts from oxidation, nitrogen or argon which is inert, is employed in this invention as an atmosphere in which welding is made.

Such atmosphere should be below −45° C. at its dew point in order to be protective, and its oxygen concentration should be less than 50 ppm, and most preferably less than 10 ppm. Under such protective atmosphere, surfaces of the above-mentioned alloy parts which are to be joined and which have been cleaned by a flux of the above-mentioned kind, are active when they are subjected to a high temperature at which they become liquidous or to a temperature around such high temperature. The active surfaces thus brought out are diffused to each other by their free molecular energies, resulting in producing fine joints thereabout.

The parts can be brought safely to a high temperature for welding without any solder.

In order to obtain such low dew point and oxygen concentration, a metallic muffle filled with a protective atmosphere gas may be employed. However, in consideration of a maximum thermal resistibility the metallic muffle can afford and also in consideration of the low oxygen partial pressure which is preferable to carry out this invention, it is desirable to make inner furnace walls or a muffle by carbon or carbon-fibre reinforced carbon. When this invention is practiced by a mesh-belt type continuous furnace, it is desirable to make a mesh-belt also by carbon-fibre reinforced carbon. By having furnace walls and so on made by carbons, their thermal resistibility is improved. In addition to this effect, there is found the following effect. That is, $O_2$ which enters into a furnace as a disturbance, reacts with solid carbons of furnace walls and so on, and is adsorbed thereto, whereby predetermined oxygen concentration and dew point can be maintained in a furnace atmosphere. Oxygen corrosion of such $O_2$ disturbance into carbon walls and so on will not adversely affect their durable years.

Thus, this invention method could be summarized as welding at a high temperature (without the use of a solder) of metallic parts made of copper-base or iron-base alloys which contain readily oxidizable elements and have a high melting point, with the employment of a non-deliquescent flux, and under a nitrogen or argon atmosphere, and preferably within a furnace, at least a part of which is made of carbons.

DETAILED DESCRIPTION OF THE INVENTION

EXAMPLE 1

Figure 1:
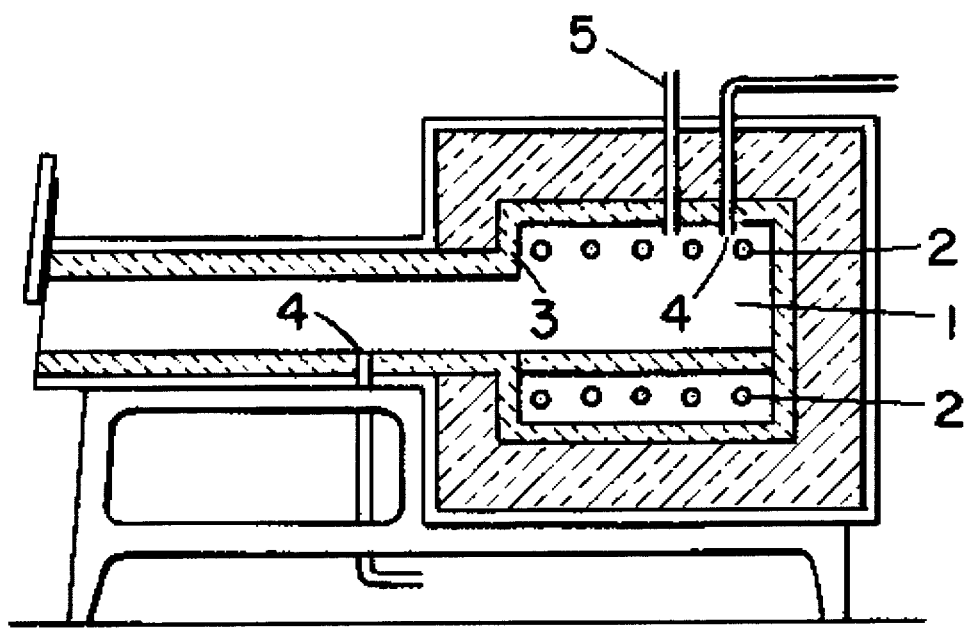
FIG. 1 is an explanatory cross sectional view of an atmosphere furnace in which this invention method was carried out.

An atmosphere furnace of the structure as illustrated in FIG. 1 and having carbon walls was employed. In the drawing, numeral 1 represents a high temperature chamber enclosed by carbon walls 3. Numerals 2 represent heaters for heating the high temperature chamber 1. And, numerals 4 represent inlets for supplying an inert gas into the furnace, and 5 an opening for inserting a thermometer.

Figure 2:
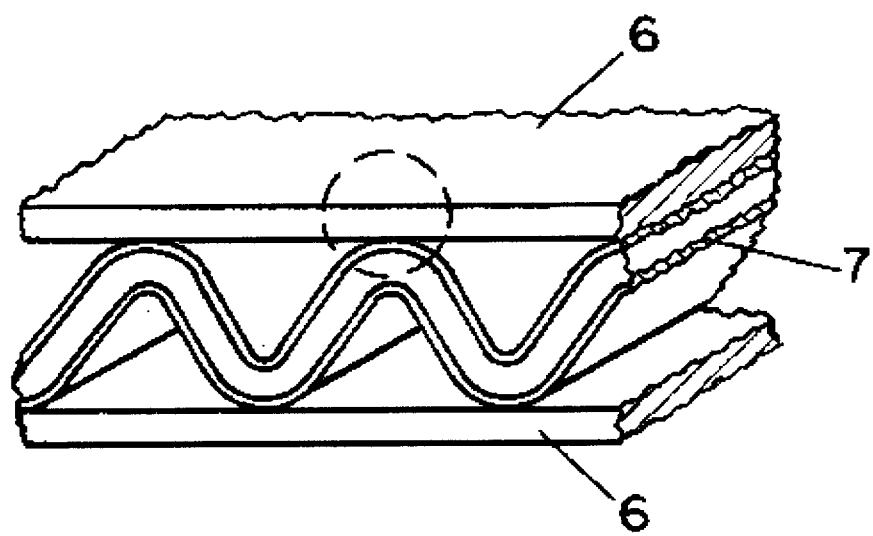
FIG. 2 is an explanatory perspective view of a part of the test piece employed in Example 1.

A test piece as illustrated in FIG. 2 which is consisted of a corrugated plate 7 of stainless steel containing 5% of Al and 0.1% of Ti sandwiched between a pair of stainless steel flat plates 6 of the same composition, was prepared. $K_3AlF_6$ of a melting point of 1,035° C. was mixed with water to produce a slurry flux of 10% of said $K_3AlF_6$. This flux was sprayed over the plates before they were assembled into the test piece.

Figure 3:
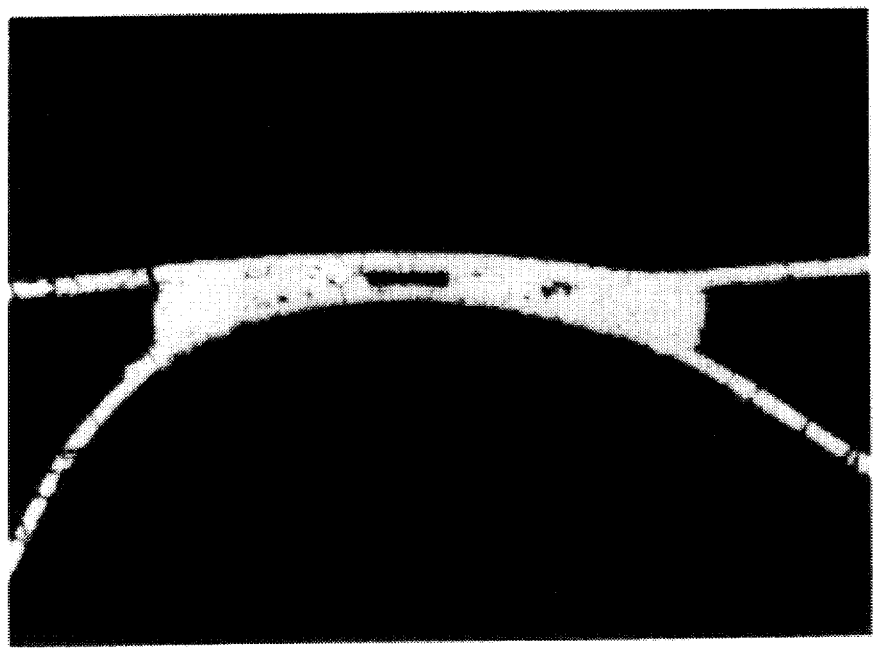
FIG. 3 is a microscopic picture (×50) of one of joints 10 of the test piece of FIG. 2.

The test piece was heated to 1,300° C. for 30 minutes in the furnace of an argon atmosphere, and then cooled in the same atmosphere. By means of this heat-treatment, at the joints including a joint encircled by dotted lines in FIG. 2, there were formed good fillets as shown in FIG. 3, presenting strong welded abutments without employing a solder. On the test piece, there was scarcely seen a residue of flux.

The atmosphere was collected from the heating chamber during the heat-treatment, its oxygen concentration was 5 ppm, and dew point −67° C., while its pressure was kept normal.

While in this Example 1 there were employed stainless steel plates, good welding results were obtained also when other high heat resistant steels and copper alloys respectively containing one or a plurality of Al, Ti, and Zr were used as test pieces. The same good results were obtained when nitrogen, and argon and nitrogen combined atmospheres were employed. And, the same good results were obtained also when $Na_3AlF_6$, $Li_3AlF_6$, and their mixture were employed as fluxes in place of $K_3AlF_6$.

EXAMPLE 2

Figure 4:
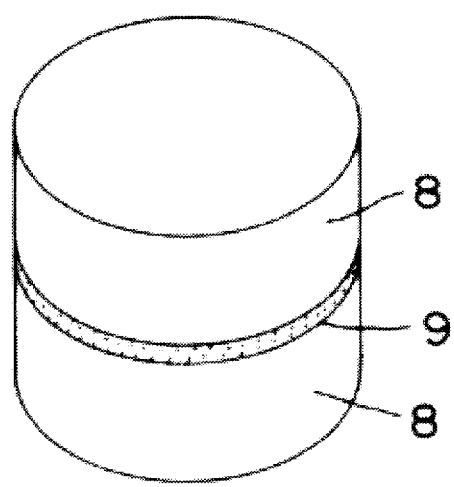
FIG. 4 is an explanatory perspective view of another test piece employed in Example 2.

As shown in FIG. 4, to an inner flat side of one of discal pieces 8, 8 made of SCM430 of 30 mm in diameter and 5 mm in thickness, there was applied a 10% slurry flux 9 of a mixture of 10% of $K_3AlF_6$ and 90% of carbon powders was mixed into methyl alcohol. Another discal piece was placed upon the other piece so that the slurry flux was sandwiched between them. The test piece thus prepared was heated to 1,150° C. for 30 minutes in the furnace of a nitrogen atmosphere, and thereafter cooled in the same atmosphere.

Figure 5:
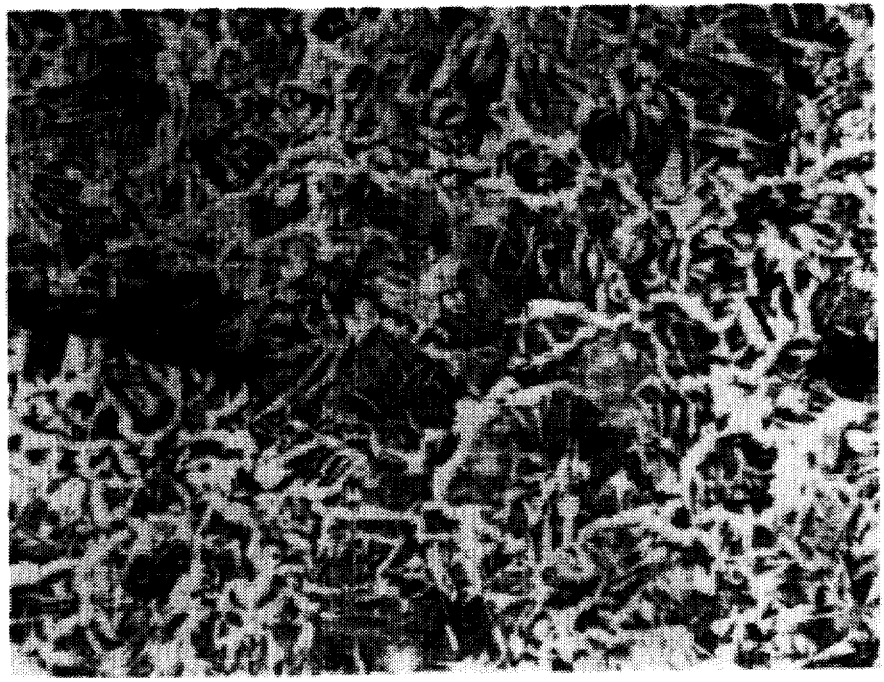
FIG. 5 is a microscopic picture of crystalline structures of the test piece of FIG. 4 at its joint portion.

This heat-treatment produced a good welded abutment as shown in FIG. 5 in which structures of the two pieces can hardly be distinguished. In FIG. 5, black scratches at the left and right sides thereof are markers to identify the abutment.

EXAMPLE 3

Figure 6:
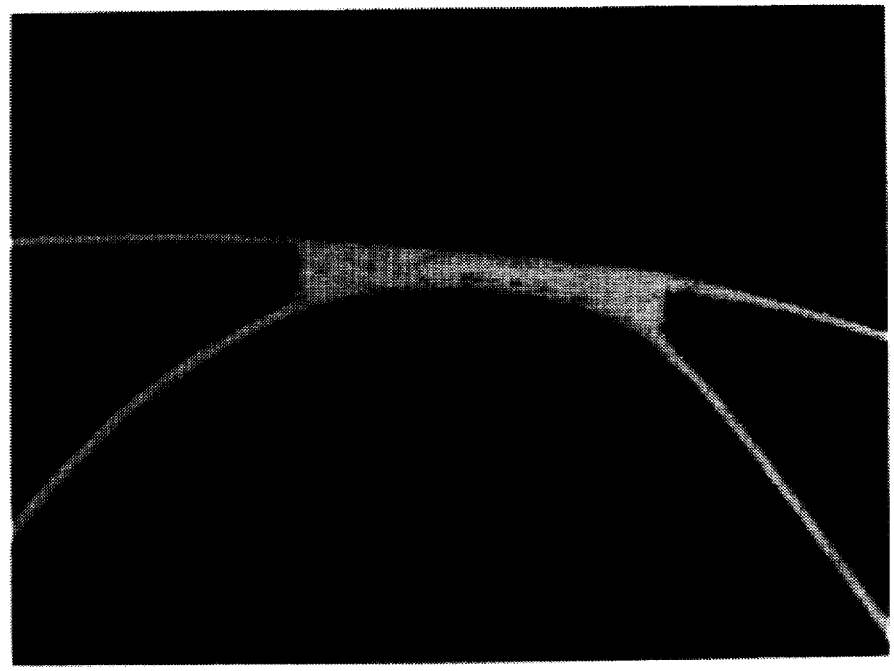
FIG. 6 is a picture same to FIG. 3 of the test piece employed in Example 3.

A test piece of the configuration same to FIG. 2 was made by plates of berrite stainless steel of SUS430. A mixture of $K_3AlF_6$ and Al powders (1:1) was mixed into ethylene glycol to obtain 10% slurry flux. The test piece was immersed into this flux, and dried at 250° C. The test piece was heated to 1,250° C. for 30 minutes in the furnace of an argon atmosphere, and then cooled in the same atmosphere. In result, good welded abutment was produced as shown in FIG. 6 without the employment of solder.

As described above in detail, in this invention, the welding of copper-base or iron-base alloy parts containing Al, Ti, Zr, and/or so on which is considered most difficult because such elements are readily oxidizable and because it has to be carried out at a high temperature, is successfully and most effectively made by the employment of an inert and non-explosive atmosphere, and of non-deliquescent flux, residues of which are not required to be washed off on account of its non-corrosiveness. It is advantageous also that the welding is made with a practically negligible amount of flux, and without solder.

I claim:

1. Method of welding metallic alloy parts, which comprises applying a non-deliquescent flux not containing any chloride but made of fluorides or fluorine compounds onto said metallic alloy parts containing one or more easily oxidizable elements such as Al, Ti, and Zr, and subjecting said parts to a high temperature under an inert atmosphere having a dew point lower than −45° C. and an oxygen concentration less than 50 ppm for welding said parts without the employment of solder.

2. The method as claimed in claim 1, in which the metallic alloy parts are made of a stainless steel, heat resistant steel, or copper alloys, and the inert atmosphere is nitrogen, argon, or their mixture.

3. The method as claimed in claims 1 or 2 in which the non-deliquescent flux contains $Na_3AlF_6$, $K_3AlF_6$, or $Li_3AlF_6$.

4. The method as claimed in claims 1, 2, or 3, walls of a furnace in which heating is made under the inert atmosphere, are made of carbons at least at its part.

5. The method as claimed in claims 1, 2, 3, or 4, in which the flux contains Al or carbon powders.

* * * * *